United States Patent
Bhukania et al.

(10) Patent No.: US 7,746,812 B2
(45) Date of Patent: Jun. 29, 2010

(54) RELIABLE PACKET DETECTION IN A WIRELESS RECEIVER WHEN PACKETS CONTAIN A KNOWN REPETITIVE SEQUENCE

(75) Inventors: Bijoy Bhukania, Bangalore (IN); Naga Satya Srikanth Puvvada, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 539 days.

(21) Appl. No.: 11/778,105

(22) Filed: Jul. 16, 2007

(65) Prior Publication Data

US 2008/0043649 A1    Feb. 21, 2008

Related U.S. Application Data

(60) Provisional application No. 60/822,712, filed on Aug. 17, 2006, provisional application No. 60/822,708, filed on Aug. 17, 2006.

(51) Int. Cl.
*H04B 7/00*    (2006.01)

(52) U.S. Cl. .................. 370/310; 370/474; 370/394

(58) Field of Classification Search .............. None
See application file for complete search history.

(56) References Cited

U.S. PATENT DOCUMENTS

| 6,426,983 | B1 | 7/2002 | Rakib et al. |
| 6,477,196 | B1 | 11/2002 | Swanke et al. |
| 6,577,670 | B1 | 6/2003 | Roberts |
| 6,768,517 | B2 * | 7/2004 | Limberg et al. ............. 348/614 |
| 6,807,222 | B1 | 10/2004 | Widdowson |
| 2002/0006174 | A1 | 1/2002 | Nafie et al. |
| 2002/0057726 | A1 | 5/2002 | Williams et al. |
| 2006/0215795 | A1 | 9/2006 | Nafie et al. |
| 2007/0055501 | A1 * | 3/2007 | Aytur et al. ................. 704/219 |
| 2008/0037458 | A1 * | 2/2008 | Myszne ..................... 370/319 |
| 2009/0060104 | A1 * | 3/2009 | Sher et al. ................... 375/345 |

FOREIGN PATENT DOCUMENTS

| EP | 812069 B1 | 12/1996 |
| WO | 0046929 A1 | 8/2000 |

* cited by examiner

*Primary Examiner*—Ajit Patel
(74) *Attorney, Agent, or Firm*—Steven A. Shaw; W. James Brady; Frederick J. Telecky, Jr.

(57) ABSTRACT

A wireless receiver operating in a wireless communication environment in which a beginning of a packet contains a repetitive sequence. The wireless receiver may compute a variance (example of a measure of variations in the cross correlation values) of cross-correlation values obtained by cross correlating a received signal and a copy of the preamble sequence starting at different time instances. When a valid packet is received, the variance of the values resulting from the cross correlation is high, otherwise the variance is low. As a result packet detection is made robust, and false packet detection due to interference signals is reduced. In an embodiment, the wireless receiver is implemented in the context of WLAN 802.11 a/g network.

11 Claims, 3 Drawing Sheets

RELIABLE PACKET DETECTION IN A WIRELESS RECEIVER WHEN PACKETS CONTAIN A KNOWN REPETITIVE SEQUENCE

RELATED APPLICATION

The present application claims priority from the following US provisional patent applications, which are all incorporated in their entirety into the present application:

1. Application Ser. No. 60/822,712 filed on Aug. 17, 2006, naming as inventors Bhukania et al, entitled, "NARROWBAND INTERFERENCE REJECTION METHOD AND APPARATUS FOR ROBUST PACKET DETECTION"; and 2. Application Ser. No. 60/822,708 filed on Aug. 17, 2006, naming as inventors Bhukania et al, entitled, "DETECTION OF NARROWBAND INTERFERENCE, AND ROBUST CHANNEL ESTIMATION AND PACKET DECODING".

BACKGROUND

1. Field of the Invention

The present invention relates generally to wireless systems, and more specifically to reliable packet detection in a wireless receiver when packets contain a known repetitive sequence.

2. Related Art

A wireless receiver receives packets (communication/data) over a wireless medium. Wireless communication is often performed in an asynchronous fashion, wherein the specific time instances of transmission of packets may not be known apriori. Therefore, a wireless receiver may check the wireless medium for the presence of a valid packet (i.e., perform packet detection), and performs further processing (such as decoding the data in the packet) upon detection of a valid packet. Since interference (generally any signal other than a desired signal) may also be present in the wireless medium it is desirable that packets be detected in a reliable manner even in the presence of such interference.

Packets may be designed to contain known repetitive sequences to aid a wireless receiver in packet detection. For example, packets transmitted according to the 802.11a/g standard contain repeated sequences (known to a potential receiver) in a preamble/header portion at the start of a packet.

A prior wireless receiver performs packet detection by cross correlating a locally stored (in the wireless receiver) preamble with a signal (potentially) present in the wireless medium. Cross correlation entails finding similarity between the local preamble and the received continuous signal starting at different time instances. When the compared signal in the wireless medium represents a preamble contained in a valid packet, a cross-correlation operation produces a result with a large value.

Thus, upon producing a large value, the compared signal is deemed to represent (a specific portion of) the preamble, and the packet is deemed to be detected. The signal portion (in the continuous signal) representing the packet is determined in relation to the compared signal. In particular, the portion following the preamble may be deemed to contain the rest of the packet of interest.

However, the cross correlation operation may also produce a similarly large valued result when the signal in the wireless medium is an interference signal, thereby reducing the reliability of the packet detection operation. The resulting false detections may be undesirable for several reasons, such as reduced effective transmission throughput (as the device may decide not to transmit in view of the 'reception' of packets), unneeded power consumption due to processing of packets, etc.

It is thus generally desirable that packets on a wireless network be reliably detected.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present invention cross-correlates a signal (received on a wireless path) with a copy of a set of elements equaling a sequence that would be repeated in each packet. Such cross-correlation is performed at multiple time instances (based on corresponding signal portions) to generate corresponding correlated values. The signal is deemed to represent a packet only if a measure of variation (e.g., variance) of the values is greater than a threshold value.

In an embodiment, such features are implemented in an 802.11a/g receiver.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

Figure 1:
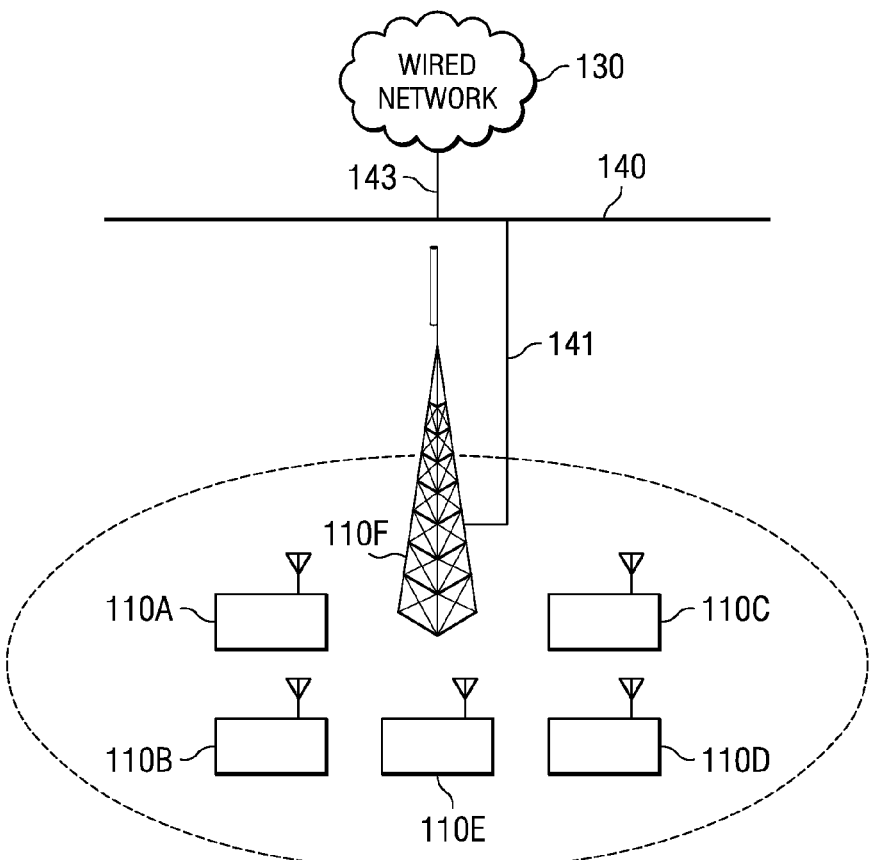
FIG. 1 is a block diagram illustrating an example environment in which several aspects of the present invention may be implemented.

FIG. 1 is a block diagram illustrating an example environment in which several aspects of the present invention may be implemented. The diagram is shown containing wireless devices 110A-110E, access point (AP) 110-F, wired network 130 and wired network backbone 140. In the example environment shown in FIG. 1, the respective components may operate consistent with the 802.11a/g WLAN standard. However, the features can be implemented in various other environments as well. Each component of FIG. 1 is described in detail below.

Each of wireless devices 110A-110E may operate as a wireless transceiver (transmit and receive), and may communicate with each other over a wireless medium either directly or via AP 110-F. Wireless devices 110A-110E may be any electronic/computing device (mobile or fixed, such as laptops, desktops, Personal Digital Assistants etc.) equipped with a wireless network interface card (or similar hardware) that enables wireless communication.

AP 110F is connected by a wired medium (141) to wired network backbone 140, which in turn is connected to wired network 130 via wired medium 143. AP 110-F provides wireless devices 110-A through 110-E connectivity with each other, and also with wired network 130. AP 110F may also contain a transceiver.

Wireless devices 110A-110E, and AP 110F may communicate (receive and transmit) with each other on a shared frequency band such as the 2.4 GHz (or 5.1 GHz) band specified by the WLAN standard. The devices could be operating in the same channel or different channels (adjacent or overlapping) within the shared band.

Wireless devices 110A-110E and AP 110F communicate through packets, which contain a repetitive sequence, for example, in a preamble/header as specified by the 802.11a/g standard. In general, each packet may be viewed as containing a header and a payload, with the payload representing the data of interest sought to be transported and the header representing the signal preceding the data of interest (for protocol reasons, generally). However, the packets may be designed to contain any repetitive sequence in alternative embodiments. The set of elements constituting the sequence may be any values, and may suitably be chosen by a designer.

A receiver portion in wireless devices 110A-110E (as well as AP 110F) may check the wireless medium for the presence of a packet, and process (including potentially receiving and decoding) rest of the packet content (payload) only upon detection of a packet. Thus, in the WLAN environment of FIG. 1, wireless devices 110A-110E (as well as AP 110F) may check for reception of a valid preamble containing a repetitive sequence.

As noted above, reception of interference signals (for example, narrowband interference from a Bluetooth/GSM and/or other wireless transmitters located in proximity to the wireless receiver in question) may cause a wireless device to register a false packet detection (i.e., indicate a valid packet when an interference signal of adequate strength is received). This is generally undesirable. Several aspects of the present invention enable reliable detection of packets as described next with examples below.

3. Packet Detection

Figure 2:
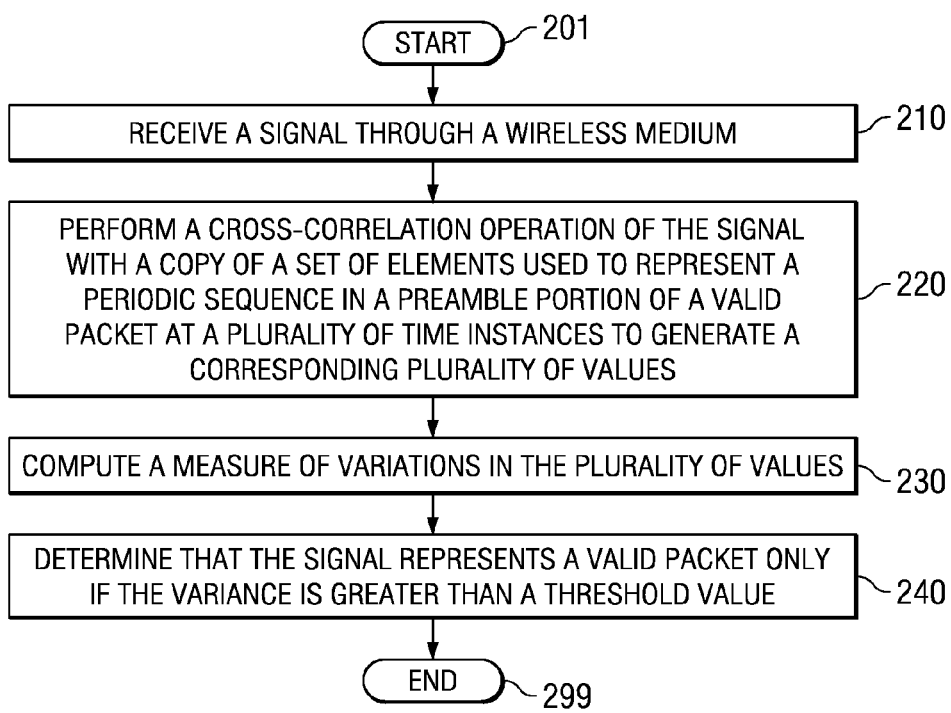
FIG. 2 is a flowchart illustrating the manner in which packets are detected reliably according to several aspects of the present invention.

FIG. 2 is a flowchart illustrating the manner in which packets are detected reliably according to several aspects of the present invention. The flowchart is described with respect to FIG. 1, and in relation to wireless device 110A, merely for illustration. However, various features can be implemented in other environments and other components. Furthermore, the steps are described in a specific sequence merely for illustration.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, wireless device 110A receives a signal through a wireless medium. As may be appreciated, the signal can be a valid signal (according to a protocol such as 802.11, etc.,) or an interference signal. An aspect of the present invention enables reliable packet detection, as described below in further detail. Control passes to step 220 from step 210.

In step 220, wireless device 110A performs a cross-correlation operation of the signal with a copy of a set of elements used to represent a sequence (which would be repeated and thus contained in a repetitive sequence) in a preamble portion of a packet. Wireless device 110A performs the cross-correlation operation at multiple time instances to generate a corresponding plurality of values representing the corresponding results of the cross-correlation. The time instances are generally spaced much shorter compared to the period in which each sequence would be repeated. In an embodiment, wireless device 110A performs cross-correlation by matching the sign of the received signal samples with sign of the sequence samples, when full precision signal is not available due to uncertainty in received signal strength.

Each result indicates a measure of the similarity between the copy of the set of elements with the signal portion received in a corresponding time duration (or starting from a corresponding time instance). The results can be generated using any of various approaches, as is well known in the relevant arts. In an embodiment, each sample of a received signal is multiplied with a corresponding sample of the copy, and the result is summed for a duration of the sequence (for example, 0.8 µSec for IEEE 802.11a/g). Control then passes to step 230.

In step 230, wireless device 110A computes a measure of variations in the plurality of values. In an embodiment, wireless device 110A generates a single variance value computed as a square of standard deviation. However, other statistical techniques to represent variations may also be used. Control then passes to step 240.

In step 240, wireless device 110A determines that the signal represents a valid packet only if the measure of variations is greater than a threshold value. The threshold value may be determined a priori based on the operating environment, strength of signals, prior knowledge of possible interference sources, etc. Control then passes to step 299 in which the flowchart ends.

When the received signal is a valid packet, the cross-correlation operation produces a result with periodic peaks and thus lead to large variations. On the other hand, when the received signal is an interference signal, the cross-correlation operation may produce a result with a large average value, but without periodic peaks, and thus produce small variations. Wireless device 110A may thus distinguish between a valid packet and an interference signal by computing a measure of variations in the cross-correlation values, as clarified further next with illustrations.

4. Variation in Cross-Correlation Values

Figure 3A:
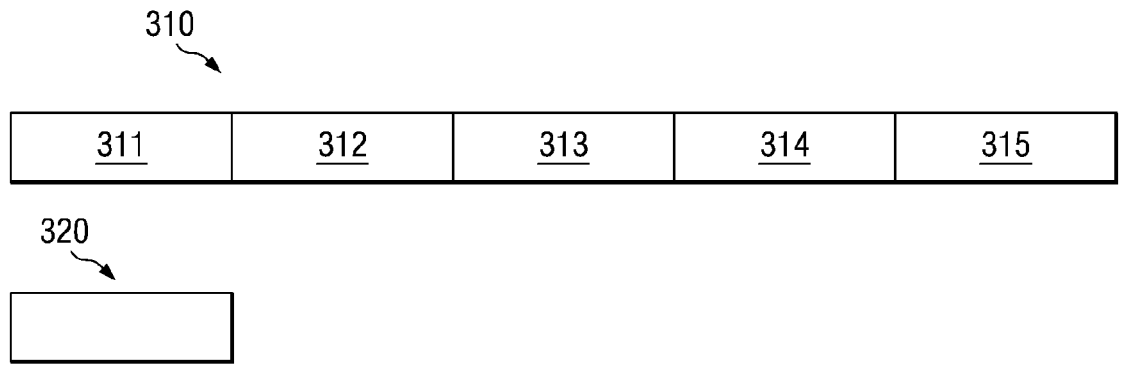
FIGS. 3A and 3B are diagrams illustrating the cross correlation operation performed by wireless device in an embodiment.
Figure 3B:
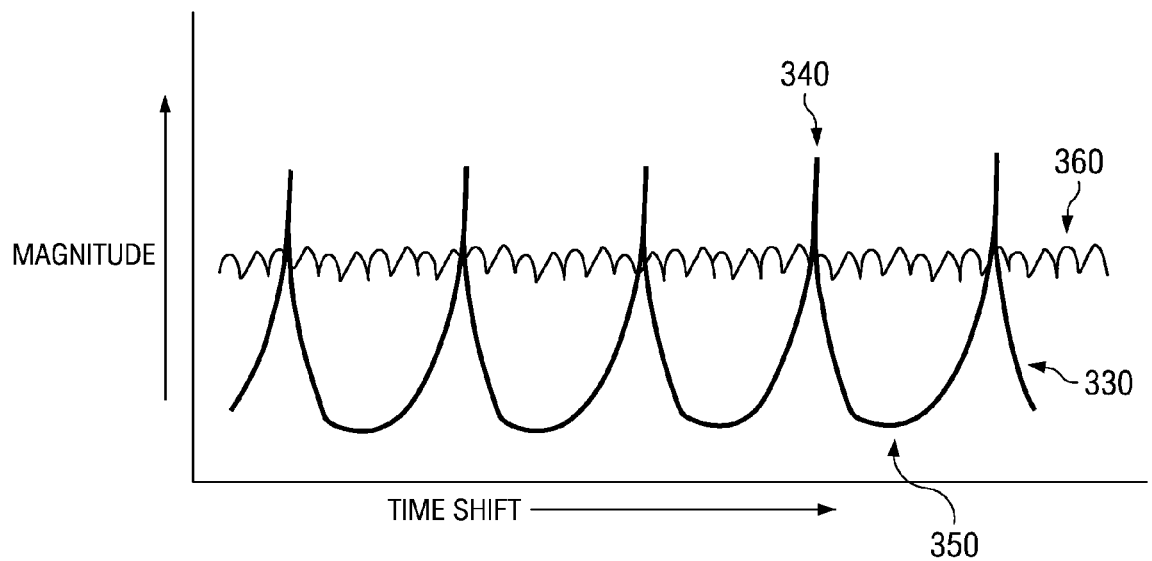

FIGS. 3A and 3B illustrate the cross correlation operation performed by wireless device 110A. Signal 310 in FIG. 3A represents a continuous signal received by wireless device 110A. Signal 310 may correspond either to a preamble portion of a valid packet or interference/noise such as narrowband continuous wave interference, bluetooth signals etc., or any other unwanted signal lying within the band of interest (receive bandwidth) of wireless device 110A).

Assuming signal 310 represents a preamble portion of a valid packet, each of fields marked 311-315 in FIG. 3A contains a same set of elements and thus represents the same sequence shown repeated and contained in 310. 310 would thus represent a repetitive sequence. 320 represents a copy of the set of elements (sequence, determined according to the 802.11 standard) stored in wireless device 110A.

FIG. 3B represents the results of cross correlation when computed with respective signal portions starting at a corresponding time instance/point. Thus, wireless device 110A cross correlates each portion of signal 310 received at a corresponding time point with 320.

When signal 310 represents a preamble portion of a valid packet the cross correlation result produces a set of values represented by 330 in FIG. 3B. Peaks (such as 340) correspond to situations when copy 320 is compared with a signal portion having a boundary aligned with the start of a corresponding sequence. When copy 320 is compared with other types of signal portions, lower values (e.g., at 350) may be obtained.

Accordingly, it may be observed that values 330 shows periodic peaks. The time period of the peaks equals the length (duration in time) of the copy 320 (or an of fields 311-315).

When signal 310 represents interference/noise, the cross correlation produces a set of values represented by 360. It may be observed that 360 does not show periodic peaks even though the correlation values may be comparable (large values) as in 330.

It may be observed from FIG. 3B that since the cross-correlation values in 330 are marked by the presence of sharp and localized peaks the variance (an example measure of variation of the cross correlation values) of the cross correlation values in 330 may be high. On the other hand, due to absence of sharp correlation peaks in the cross correlation values 340, variance of the cross correlation values in 360 will be relatively small.

Thus, according to an aspect of the present invention, wireless device 110A computes a measure of the variations in the values produced by the cross correlation operation to determine if the received signal represents a valid packet or not.

Wireless device 110A may be implemented to provide features in accordance with several aspects of the present invention as described above, and the description is continued with details of an example implementation.

5. Wireless Receiver

Figure 4:
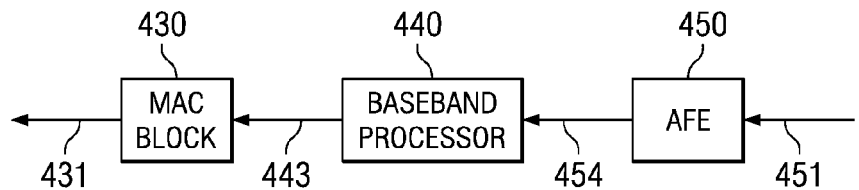
FIG. 4 is a block diagram of a portion of a wireless device performing packet detection in an embodiment of the present invention.

FIG. 4 is a block diagram of a portion of wireless device 110A in an embodiment of the present invention. The diagram is shown containing MAC block 430, baseband processor 440 and analog front-end (AFE) 450. Only receive signal paths are shown in FIG. 4, but transmit paths (and transmit operations as well as control paths) may also be present and are not shown or described as not being relevant to an understanding of the features sought to be illustrated. Further, internal details of wireless device 110A are shown in the context of WLAN 802.11a/g merely for illustration. However, wireless device 110A may be implemented in other contexts/environments as well. Each block of FIG. 4 is now described.

MAC block 430 receives demodulated (and processed) WLAN packets from baseband processor 440 on path 443, and performs 802.11a/g MAC functions, which may include access protocol, receive (RX) processing, and wired-equivalent privacy (WEP) decryption. MAC block provides processed data from WLAN packets on path 431 to a host CPU (not shown).

AFE 450 receives on path 451 a signal from a wireless medium via an antenna and a radio receiver (not shown, but which may also be contained in wireless device 110A). The signal received on path 451 may correspond to a preamble portion of a valid packet or interference/noise as noted in sections above. AFE 450 may perform operations such as amplification, filtering, signal conditioning and analog to digital (A/D) conversion of signal 451, and forward the corresponding digital codes to baseband processor 440 via path 454.

It is noted here that before a packet is detected signal strength of a signal in the wireless medium may not be known to wireless receiver 110A, often resulting in wireless receiver 110A setting a non-optimal value of amplification in an amplifier in AFE 450. As a result, when the amplified signal is sampled and quantized using the Analog to Digital Converter (ADC) in AFE 450, the signal may be "clipped" by the ADC. In some instances, only a sign (specifying whether the signal value is positive or negative) of the digital signal (after A/D conversion) may be reliable.

Consequently, to accommodate such uncertainty/unreliability of signal amplitude when wireless receiver 110A is yet to detect a packet, prior packet detection using cross correlation techniques may have to be performed using only sign of the received signal and sign of the local copy of the sequence. However, use of only sign of the received signal for packet detection often gives rise to the cross correlation operation producing large valued results even when the signal in the wireless medium is an interference signal. Therefore, relying merely on cross correlation values (as against a measure of variation in the cross correlation values according to aspects of the present invention) may render packet detection unreliable.

Continuing with a description of FIG. 4, baseband processor 440 performs various operations such as demodulation of digital codes (corresponding to WLAN packets) received from AFE 450, decoding and descrambling of data, physical-layer convergence protocol (PLCP) generation, clear-channel assessment (CCA) calculation and antenna diversity etc., consistent with the specific protocol and standards (802.11a/g in the example embodiment of FIG. 4). Baseband processor 440 forwards the processed packets to MAC block 430 on path 440.

In particular, baseband processor 440 performs packet detection in accordance with several aspects of the present invention as described above. Baseband processor 440 may further process the digital codes, only upon determining that they represent a valid packet. The description is continued with an illustration of the internal details of a packet detection block contained in baseband processor 440 in an embodiment.

6. Packet Detection Block

Figure 5:
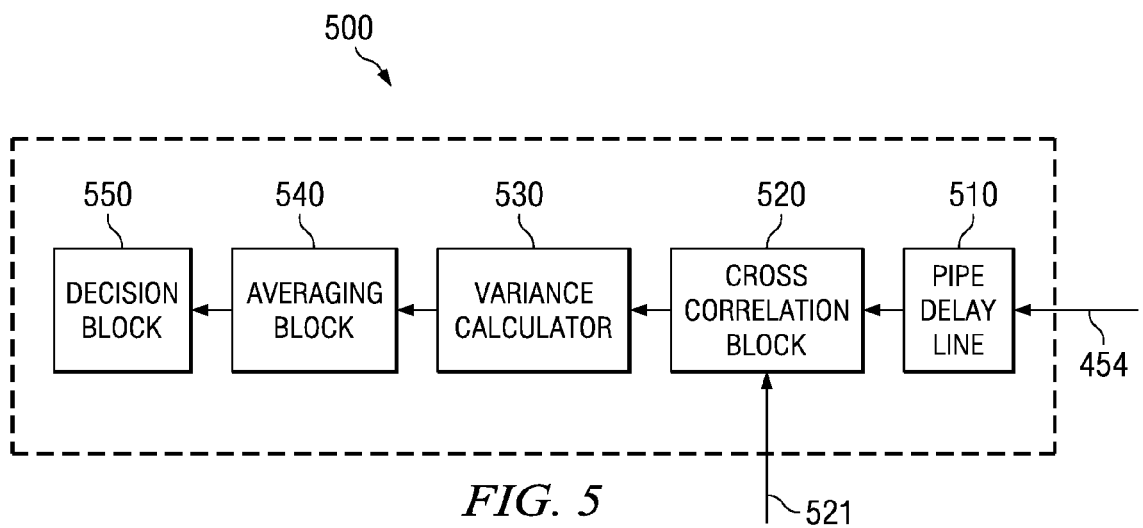
FIG. 5 is a block diagram of a packet detection block contained in wireless devices in an embodiment of the present invention.

FIG. 5 is a block diagram of a packet detection block contained in baseband processor 440 in an embodiment. The diagram is shown containing pipe delay line 510, cross correlation block 520, variance calculator 530, averaging block 540 and decision block 550. Each of the blocks shown in the figure represents a functional block, and is described in detail below.

Pipe delay line 510 receives on path 454 digital codes representing either a preamble portion of a valid packet or interference/noise. Pipe delay line 510 stores the codes in memory locations in a manner such that each set of memory locations stores codes corresponding to one set of elements constituting a sequence. To illustrate with respect to FIG. 3A, pipe delay line 510 may store field 311 in a first set of memory locations, field 312 in a second set of memory locations, and so on. Pipe delay line may provide the addresses of the corresponding sets of memory locations to cross correlation block 520.

Cross correlation block 520 receives a copy of the set of elements (sequence) on path 521, and performs a cross correlation, as described above) of the copy with the contents of each of the sets of memory locations as indicated by pipe delay line 510. Cross correlation block 520 may forward the results of the cross correlation (the set of values produced by the cross correlation operation over the length an entire sequence) to variance calculator 530.

Variance calculator 530 computes a variance (an example of a measure of variation) of the values produced by the cross correlation as described in sections above. To illustrate with respect to FIG. 3A, variance calculator 530 computes a variance in the cross correlation values obtained by cross correlating copy 320 with each of fields 311-315. Variance calculator 530 may forward the variance values to averaging block 540.

Averaging block 540 computes the average of the variance values received from variance calculator 540. In certain embodiments, depending on network environment and interference scenario, averaging block may be bypassed (not be used). Averaging block 540 may provide the averaged variance value to decision block 550.

Decision block 550 may compare the averaged variance value with thresholds to determine if the digital codes received on path 454 represents a valid packet or not. In an alternative embodiment (such as when averaging block 540 is not used), decision block 550 may note whether a certain number (e.g., two out of consecutive three) variance values are above a threshold (which, in general, may be programmable to accommodate different scenarios, environments etc) to make such a determination. Decision block 550 may set or clear a flag bit depending on the result of the comparison, and take appropriate action in order to reject interference such as resetting the packet detection state machine implementing pipe delay line 510, cross correlation block 520, variance calculator 530, averaging block 540 and decision block 550.

Thus, wireless device 110A computes a measure of the variation in the cross correlation values as described above to determine if a signal represents a valid packet or not. The manner in which wireless device 110A computes the measure is illustrated next with examples.

7. Computing a Measure of Variation

With respect to values 330 in FIG. 3B, assuming that the periodicity of the cross correlation peaks (such as peak 340) is T units of time (corresponding to duration/length of copy 320 and also any of fields 311-315 in FIG. 3A), and that correlation is performed for N time shift values within T, N cross correlation values are obtained. The value of N may be selected based on the sampling rate in the A/D converter (contained in AFE 450 noted above with respect to FIG. 4) in wireless receiver 110A. Typically, duration/length of copy 320 (and fields 311-315) is N samples, so that $T=N \times F_s$, with $F_s$ being the sampling rate in samples/unit time. The average (mean) of the N cross correlation values is given by equation 1 below:

$$\overline{x_k} = \frac{1}{N} \sum_{i=kN}^{(k+1)N-1} x_i \qquad \text{Equation 1}$$

wherein,
$\overline{x_k}$ is the mean of cross correlation values $X_i$, for values of index i from Kn to (k+1)(N−1)

The variance $\Sigma k$ of the cross correlation values Xi is given by equation 2:

$$\sum k = \frac{1}{N} \sum_{i=kN}^{(k+1)N-1} (x_i - \overline{x_k})^2 \qquad \text{Equation 2}$$

Rearranging the terms in equation 2 provides an expression for variance $\Sigma k$ as in equation 3

$$\sum k = \frac{1}{N} \sum_{i=kN}^{(k+1)N-1} x_i^2 - \left\{ \frac{1}{N} \sum_{i=kN}^{(k+1)N-1} x_i \right\}^2 \qquad \text{Equation 3}$$

It may be noted that variance is computed for every N cross correlation values. In an embodiment, N has a value of 32, i.e., each of copy 320 and fields 311-315 contains 32 data samples, and 32 cross correlation values are obtained from each cross correlation operation Wireless device 110A may thus compute a variance of the cross correlation values between copy 320 and each of fields 311-315 according to equation 3, and compute an average of the variance values obtained. If the average variance is less than a threshold value, wireless device 110A may conclude that the received signal 310 represents interference/noise.

If the average variance is greater than (or equal to) the threshold value, wireless device 110A determines that signal 310 represents a preamble portion of a valid packet. The threshold value may be determined beforehand based on factors such as the environment in which wireless device 110A operates, prior knowledge of possible interference sources, signal strengths of the packets etc. Further, while a single variance value $\Sigma k$ as specified by equation 3 is described as being used as a detection metric, multiple variance values could also be used.

Some high frequency and/or high power narrowband interference signals may also cause a large variance (as computed using equation 3) in cross correlation values. Therefore, to provide good interference rejection even in such instances wireless device 110A may compute another measure of variation (termed for ease of description as modified variance) different from the variance specified by equation 3, as described below.

For ease of description, the following terminology is used:

$$\sum_{i=kN}^{(k+1)N-1} x_i^2$$

is denoted by A, and $$\sum_{i=kN}^{(k+1)N-1} x_i$$

is denoted by B, wherein each of terms A and B are as noted above with respect to equation 3. Within a given time window of N samples for which variance is computed, terms A and B are progressively updated as follows:

$A=A+x_i^2$, and $B=B+x_i$, so that, at the end of N samples, complete values of A and B may be obtained.

For the computation of the modified variance, if wireless device 110A notes that three consecutive cross correlation values (x(k), x(k−1) and x(k−2) in the pseudocode below) have the same value (a situation that may arise when the received signal represents a high frequency and/or high power narrowband interference signal noted above) then term A is not updated, and instead term B is updated. The manner in which the modified variance is computed by updating A and B is provided below in the form of a pseudocode, in which x(k) represents the kth cross correlation value, and A represents the 'power of' operation:

$$
\begin{aligned}
&A = 0 \\
&B = 0 \\
&\text{for } i = kN \text{ to } (k+1)N \\
&B = B + x(k) \\
&\text{if } x(k) == = x(k-1) \,\&\&\, x(k) == = x(k-2) \\
&A = A + 0 \\
&\text{else} \\
&A = A + [x(k)]^{\wedge}2 \\
&\text{end} \\
&\Sigma k \text{ (modified)} = (A - B)/N \\
&\text{wherein } \Sigma k \text{ (modified) is the modified variance.}
\end{aligned}
\qquad \text{Equation 4}
$$

It may be observed that the modified variance metric as specified by equation 4 may result in a smaller value when compared with the variance computed using equation 3. Thus, a high frequency and/or high power narrowband interference signal which would otherwise (if equation 3 were to be used) cause a large variance in the cross correlation values, may be distinguished from a valid packet.

Having computed variance according to equation 3 or modified variance according to equation 4, wireless device 110A may compare average of the computed variance (or modified variance) with a threshold (either pre-computed or provided dynamically to wireless device 110A). If the variance is greater than or equal to the threshold, wireless device 110A may conclude that the received signal represents a valid packet. If the variance is less than the threshold, wireless device 110A may conclude that the received signal represents interference/noise.

Thus, several aspects of the present invention enable reliable detection of packets. It may be appreciated from the description provided that false detection (false alarms) due to interference may be greatly reduced even if the sequence has relatively poor auto-correlation properties.

An embodiment of a wireless device incorporating one or more features of the present invention is described next.

8. Wireless Device

Figure 6:
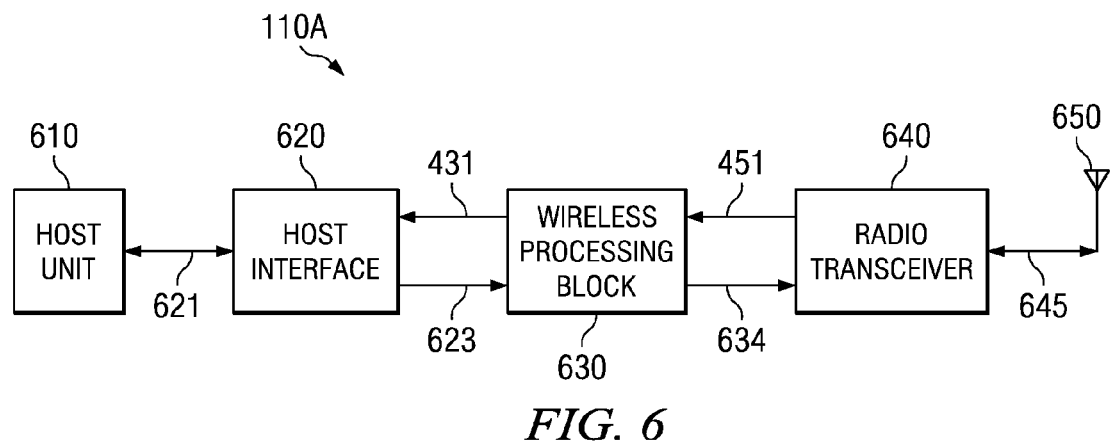
FIG. 6 is a block diagram of an embodiment of a wireless device in which several features of the present invention may be provided.

FIG. 6 is a block diagram of wireless device 110A in an embodiment, and may correspond to a personal digital assistant (PDA), mobile phone, etc. Wireless device 110A is shown containing host unit 610, host interface 621, wireless processing block 630, radio receiver 640 and antenna 650. Each component/block is described below.

Host unit 610 may contain one or more processing units, memory and other hardware/firmware to provide desired features. In general, host unit 610 receives data (contained in each payload) from path 431/621 and processes the data to provide various applications used by a user. For example, host unit 610 may be designed to provide features of a PDA, mobile phone, etc. Host unit 610 may also send data via host interface 620 to wireless processing block 630 for transmission.

Host interface 620 provides the interface between wireless processing block 630 and host unit 610 for sending (path 623) and receiving data (path 431).

Radio transceiver 640 provides radio receiver operations for data packets received in RF form from antenna 450 and forwards the received RF signal to wireless processing block 630 on path 451. Radio transceiver also provides radio transmitter operations for data (packets) received from wireless processing block 630 on path 634 and transmits corresponding RF signals via paths 645 and antenna 650.

Wireless processing block 630 represents blocks 430, 440, and 450 of FIG. 4, and may be designed to provide several features of the present invention as described above. The wireless processing block may recover the data in the payload portion of each received packet and send the data on path 431 to host unit 610.

9. CONCLUSION

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of detecting reception of packets in a wireless receiver, a preamble portion of each packet comprising a set of elements repeated to form a repetitive sequence, said method being implemented in said wireless receiver, said method comprising:
receiving a signal on a wireless medium;
cross-correlating said signal with a copy of said set of elements at a plurality of time instances to generate a corresponding plurality of values, said cross-correlating comprising:
multiplying each of a subset of signal values with corresponding element of said set of elements and adding the results of said multiplying to generate one of said plurality of values;
computing a measure of variation in said plurality of values;
determining that said signal represents said packet only if said measure of variation is greater than a threshold value; and
generating a plurality of signal values representing the strength of said signal at corresponding time instances.

2. The method of claim 1, wherein said wireless receiver is designed to operate according to the 802.11a/g standard.

3. The method of claim 1, wherein said measure represents a variance of said plurality of values.

4. A method of detecting reception of packets in a wireless receiver, a preamble portion of each packet comprising a set of elements repeated to form a repetitive sequence, said method being implemented in said wireless receiver, said method comprising:
receiving a signal on a wireless medium;
cross-correlating said signal with a copy of said set of elements at a plurality of time instances to generate a corresponding plurality of values;
computing a measure of variation in said plurality of values, wherein said computing comprising:

forming a first term by adding each of said plurality of values;

forming a second term by adding a square of each of said plurality of values except that the square of a value is not added if a preceding number of values equals the value;

setting said measure of variation to equal (said second term-said first term)/number of values in said plurality of values; and determining that said signal represents said packet only if said measure of variation is greater than a threshold value.

5. A wireless receiver designed to detect reception of packets in a wireless receiver, a preamble portion of each packet comprising a set of elements repeated to form a repetitive sequence, said wireless receiver comprising:

an antenna to receive a signal on a wireless medium;

an analog front end to generate a plurality of digital codes representing the strength of said signal at corresponding time instances; and a processor to cross-correlate said signal with a copy of said set of elements at a plurality of time instances to generate a corresponding plurality of values and to compute a measure of variation in said plurality of values, said processor determining that said signal represents said packet only if said measure is greater than a threshold value, wherein said processor generates a plurality of signal values representing the strength of said signal at corresponding time instances, said processor multiplying each of a subset of said plurality of signal values with corresponding elements of said set of elements and adding the results of said multiplying to generate one of said plurality of values in cross-correlating said signal with a copy of said set of elements.

6. The wireless receiver of claim 5, wherein said wireless receiver is designed to operate according to the 802.11a/g standard.

7. The wireless receiver of claim 5, wherein said measure represents a variance of said plurality of values.

8. A wireless device comprising:

an analog front end to receive a signal on a wireless path, said signal corresponding to a preamble portion of a packet comprising a set of elements repeated to form a repetitive sequence said analog front end operable to generate a plurality of digital codes representing the strength of said signal received on said wireless path at corresponding time instances;

a processor to cross-correlate said signal with a copy of said set of elements at a plurality of time instances to generate a corresponding plurality of values and to compute a measure of variation in said plurality of values, said processor determining that said signal represents said packet only if said measure is greater than a threshold value, said processor generating a plurality of payload values from a payload portion of said packet, wherein said processor computes said measure of variation by forming a first term by adding each of said plurality of values, forming a second term by adding a square of each of said plurality of values except that the square of a value is not added if a preceding number of values equals the value, and setting said measure of variation to equal (said second term-said first term)/number of values in said plurality of values; and a host unit processing said plurality of payload values.

9. The wireless device of claim 8 further comprising an antenna receiving said signal.

10. The wireless device of claim 9, wherein said analog front-end, said processor, and said antenna are designed to operate consistent with the 802.11a/g standard.

11. The wireless device of claim 8, wherein said measure represents a variance of said plurality of values.

* * * * *